Dec. 8, 1925.
H. FLETCHER
TESTING CIRCUITS
1,564,228
Filed Dec. 28, 1921  3 Sheets-Sheet 1
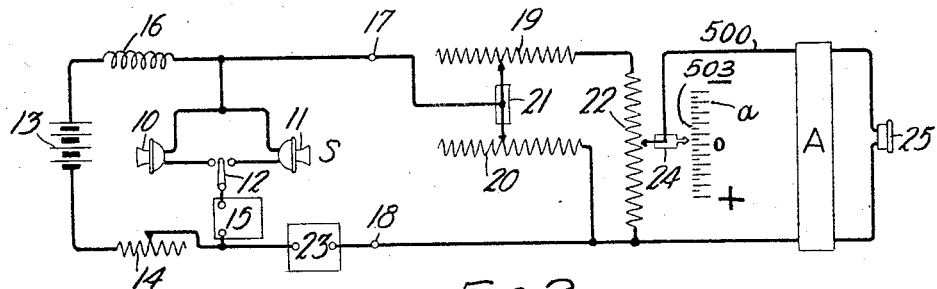
Fig. 1.
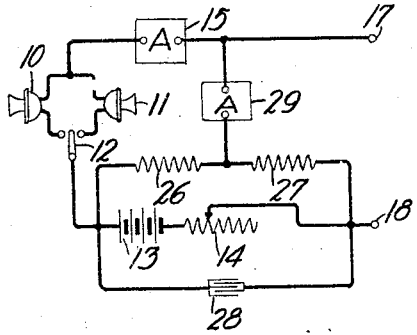
Fig. 2.
Fig. 8.
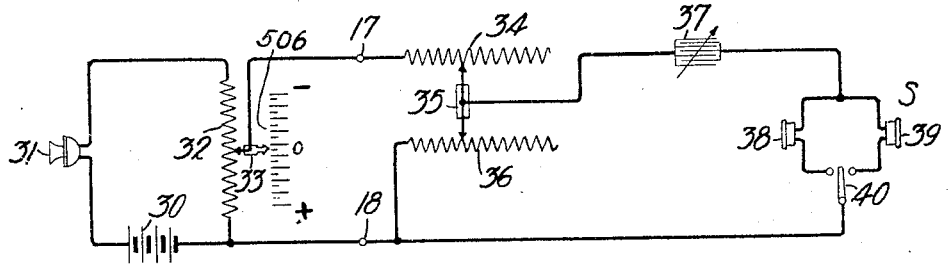
Fig. 3.
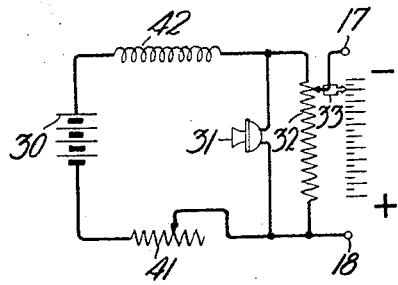
Fig. 4.
Inventor:
Harvey Fletcher,
by (signature)
Atty Dec. 8, 1925.

H. FLETCHER

TESTING CIRCUITS

Filed Dec. 28, 1921

Inventor:
Harvey Fletcher.
by *[signature]*
Atty.

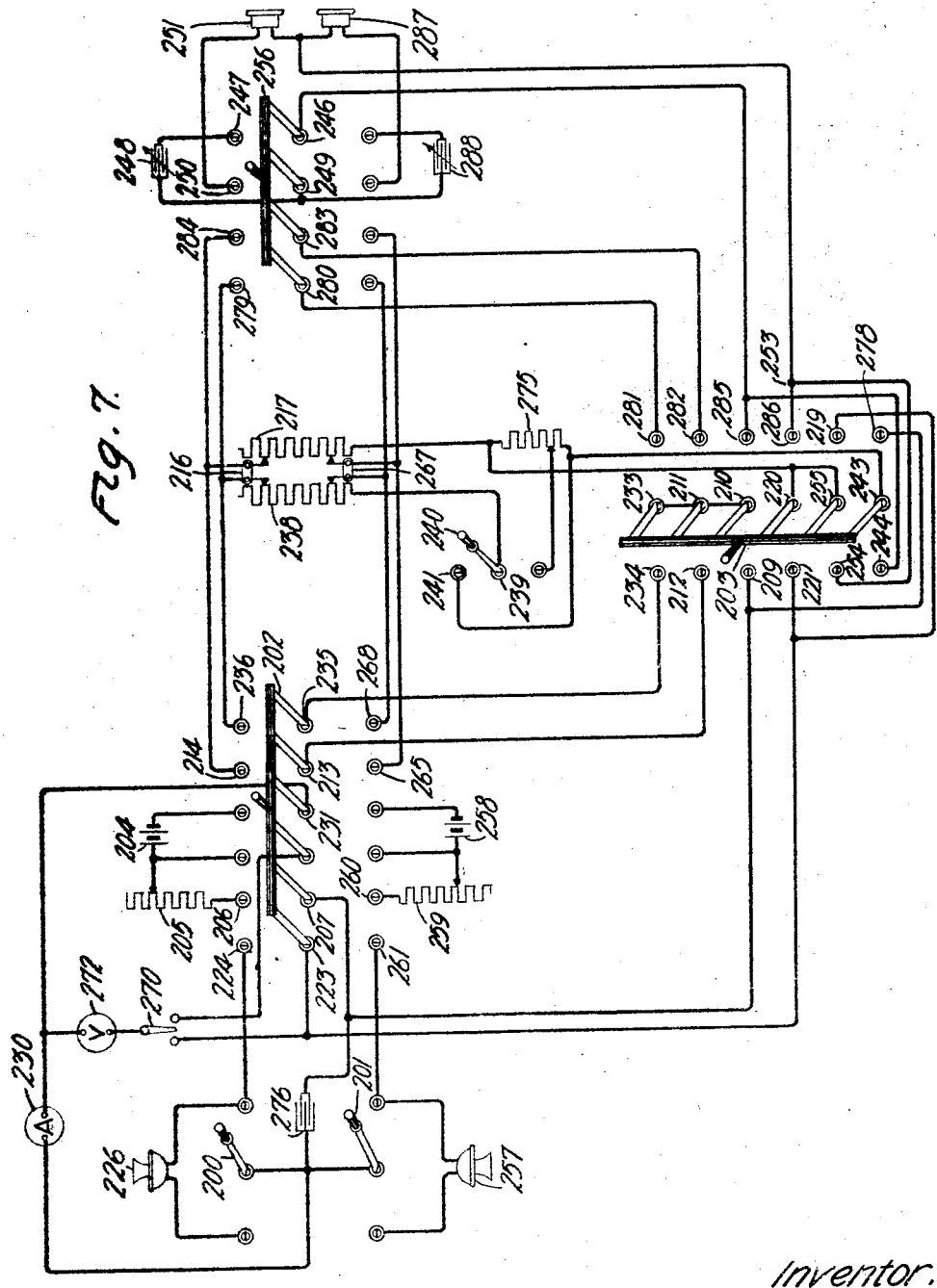

Patented Dec. 8, 1925.

1,564,228

UNITED STATES PATENT OFFICE.

HARVEY FLETCHER, OF NEW YORK, N. Y., ASSIGNOR TO WESTERN ELECTRIC COMPANY, INCORPORATED, OF NEW YORK, N. Y., A CORPORATION OF NEW YORK.

TESTING CIRCUITS.

Application filed December 28, 1921. Serial No. 525,304.

*To all whom it may concern:*

Be it known that I, HARVEY FLETCHER, a citizen of the United States, residing at New York, in the county of New York, State of New York, have invented certain new and useful Improvements in Testing Circuits, of which the following is a full, clear, concise, and exact description.

This invention relates to testing circuits and particularly to circuits for determining the efficiency of apparatus for the transmission of voice currents.

An object of the invention is to provide a circuit arranged for the quick and accurate determination of the efficiency of speech transmission apparatus by the comparison method.

Another object is to provide a testing circuit which will permit rapid determination of the inherent efficiency of transmission apparatus at any frequency.

Another object is to provide a testing circuit so arranged that when used in connection with a current of complex wave form, it will not discriminate against any of the impressed frequencies.

To accomplish these objects, there is provided a distortionless testing circuit by means of which the apparatus to be tested is compared with a standard. There is provided also, a combination of shunt and series resistances jointly adjustable to maintain a certain methematical relationship and to permit adjusting the circuit so that the impedances of the transmitting and receiving stations are the same.

The efficiencies with which the present invention is concerned are transmission efficiencies which may be evaluated in terms of any suitable transmission unit such as "miles of standard cable". The bases for expressing the transmission efficiency of a piece of equipment as "$n$" miles of standard cable is that the piece of equipment causes a fractional reduction in the power received over the circuit in which it is placed, which is the same as the fractional difference in the amounts of power at two points "$n$" miles apart along an infinite length of standard cable. If current is being supplied over a transmission line of infinite length and points 1 and 2 which are "$n$" miles apart are considered, the ratio of the amounts of power at these two points is equal to the square of the ratio of the currents, or to the square of the ratio of the voltages at these two points, and this ratio can be expressed in terms of the attenuation per mile of the line, viz:

$$(\text{I}) \quad \frac{\sqrt{P_2}}{\sqrt{P_1}} = \frac{I_2}{I_1} = \frac{E_2}{E_1} = \epsilon^{-n\alpha}$$

where P, I and E equal power, current and voltage, respectively, and the subscript shows whether the quantity is at point 1 or point 2. $\alpha$ is the attenuation constant per mile of the line given by the following equation:

$$(\text{II}) \quad \alpha = \sqrt{(r+j\omega L)(g+j\omega C)}$$

where $r$, L, $g$, and C are respectively the resistance, inductance, leakage conductance, and capacity per mile of the line. $j$ is equal to $\sqrt{-1}$ and $\omega$ is equal to $2\pi$ times the frequency. The equation assumes that the power at point 2 is less than the power at point 1, but if the points were so selected that the reverse were the case, the equation would be the same except that "$n$" would have a positive sign instead of a negative sign.

If a circuit containing a piece of equipment to be tested delivers an amount of power equal to $P_3$, and the same circuit delivers an amount of power equal to $P_4$ when the piece of equipment to be tested is replaced by a standard piece, the ratio $\frac{\sqrt{P_3}}{\sqrt{P_4}}$ can be subtituted into the above equation giving:

$$(\text{III}) \quad \frac{\sqrt{P_3}}{\sqrt{P_4}} = \epsilon^{-n\alpha}$$

where $\alpha$ is the attenuation constant per mile of standard cable. This equation can be solved for "$n$", thus giving the efficiency of the apparatus in terms of miles of standard cable. The solution of the equation is $$(\text{IV}) \quad n = \frac{1}{\alpha} \log_\epsilon \frac{\sqrt{P_3}}{\sqrt{P_4}}$$

If the ratio $\frac{\sqrt{P_3}}{\sqrt{P_4}}$ is less than unity, the value of "$n$" is negative and the apparatus to be tested causes a loss of "$n$" miles of standard cable in comparison to a standard piece of apparatus; and if the ratio is greater than unity, the value of "$n$" is positive and the apparatus to be tested causes a gain of "$n$" miles of standard cable. It is thus seen that the efficiency of the apparatus may be either positive or negative, according to whether it causes a loss or a gain.

A telephone transmitter, as any other source of electrical energy, is capable of delivering the greatest output if the circuit to which it is connected has an impedance conjugate to the internal impedance of the source; i. e. if the resistance of the external circuit is equal to the internal resistance of the source and the reactance of the external circuit is equal to, but opposite in sign to the internal reactance of the source. Likewise, a receiver is capable of receiving the most power from a circuit if the impedance of the circuit is conjugate to that of the receiver. A carbon granule transmitted has no reactance and hence its conjugate impedance is a pure resistance equal to the resistance of the transmitter. A receiver has an inductive reactance and hence its conjugate impedance must have a corresponding capacity reactance.

In accordance with a feature of this invention, the efficiencies of transmitters and receivers are measured under the foregoing conditions under which they deliver or receive the greatest possible amount of power. The efficiency measured under such conditions is termed the inherent efficiency of the piece of apparatus.

Referring to the drawings:

Fig. 1 discloses diagrammatically a circuit for testing transmitters, embodying the features of this invention;

Fig. 2 discloses an alternative means for the current supply of the circuit shown in Fig. 1;

Fig. 3 discloses a testing circuit adapted for testing telephone receivers;

Fig. 4 shows a modification of the method of supplying current to the circuit arrangement of Fig. 3;

Figure 5:
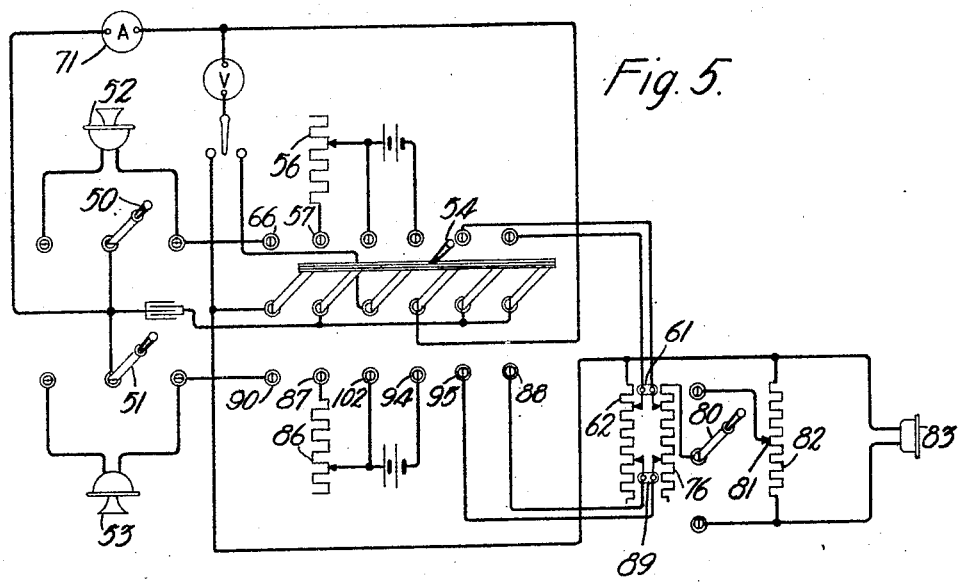
Fig. 5 shows a circuit for the commercial testing of transmitters in accordance with the arrangement shown diagrammatically in Fig. 1.
Figure 6:
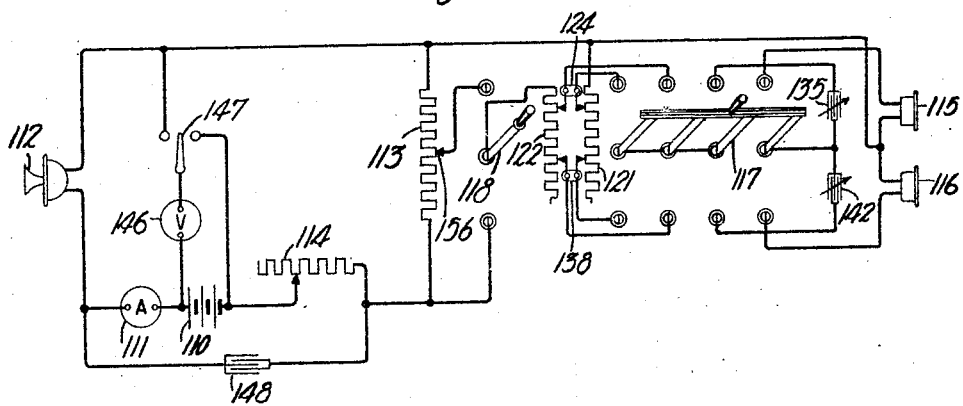
Fig. 6 shows a circuit arrangement for the commercial testing of receivers in accordance with the arrangement shown diagrammatically in Fig. 3.

Fig. 7, which is a combination of the circuits of Figs. 5 and 6, discloses a circuit for the quick determination of efficiency of either transmitters or receivers.

Fig. 8 is a schematic diagram showing a simplification of Fig. 1 for mathematically explaining the operation of the circuit.

Referring to Fig. 1, means is provided for determining the efficiency of a transmitter 10 under test by comparing it with a standard transmitter 11, the circuit arrangement being such that the efficiency of each transmitter is determined under the conditions of maximum output. By means of the switch 12, it is possible to place either transmitter in series with a source of current supply 13, current adjusting resistance 14, meter 15 and inductance coil 16. The resistance 14 permits adjusting the resistance of the circuit to provide the desired transmitter current. An adjustable resistance 19 is connected in series with a potentiometer coil 22 and meter 23, and an adjustable resistance coil 20 is connected across the line as shown in parallel with resistances 19 and 22. A contact member 21 is provided for simultaneously adjusting the resistances 19 and 20 step-by-step. These resistances are so designed that for any position of the contact maker 21, the portion of the series resistance 19 included in the circuit is a certain constant times the square root of the portion of the shunt resistance 20 included in the circuit. By maintaining this relationship such that the resistance of the series coil 19 is equal to a constant times the square root of shunt coil 20, the current flowing through the potentiometer resistance 22 is equal to a constant times the square root of the power delivered by the transmitter. As will be explained presently, this makes it possible to measure the inherent efficiency of the transmitter being tested irrespective of the resistance of the transmitter itself provided that the value of the potentiometer resistance 22, and the resistance of the transmitter under test are small as compared with the resistance of series coil 19. To fulfill this condition, it has been the practice to employ a potentiometer resistance of approximately 100 ohms and to choose a constant equal to 1000 in which case the error due to the resistance values of the transmitter and potentiometer is negligible. It is also necessary that the impedance of the circuit comprising conductors 500 and 501 be large as compared with the impedance of the potentiometer. A contact maker 24 and suitable scale are provided for the potentiometer coil 22, and receiver 25 is furnished for listening purposes. In the testing of certain types of transmitters it is necessary to increase the strength of the sounds received and an amplifier A is provided for that purpose. The purpose of the adjustable resistance coils 19 and 20 is to secure a resistance in the receiving circuit equal to that in the transmitting circuit, thus permitting testing the transmitters under conditions of maximum output and to supply a constant source of power at the potentiometer with transmitters having the same inherent efficiency. The scale of the potentiometer 24 is preferably calibrated to read directly in transmission efficiency units.

With the arrangement disclosed, the contact member 21 is moved in engagement with the resistances 19 and 20 until a point is obtained for each transmitter at which the response in the receiver 25 is a maximum. The contact member 24 is then adjusted until the response in receiver 25 is equal for transmitters 10 and 11, the contact member 21 being moved to the previously determined settings for the respective transmitters when the switch member 12 is thrown. Such an arrangement obviously is difficult of manipulation, and for commercial testing a circuit is preferably employed of the type shown in Fig. 5.

The following analysis taken with the preceding explanation of the basis for expressing efficiencies in terms of miles of standard cable, shows that the scale of the potentiometer may be calibrated to read directly efficiencies in terms of miles of standard cable. In Fig. 1, the resistances of meters 15 and 23 are negligibly small and the impedance looking into amplifier A is so great that its effect upon the circuit may be neglected. Hence, Fig. 1 with any given transmitter in circuit, reduces to Fig. 8, considering only the portion which is traversed by voice current.

Referring to Fig. 8, let the resistance of the transmitter be equal to T; the resistance of element 20 be equal to X; the resistance of element 19 be equal to $K\sqrt{X}$; and the resistance of the potentiometer be equal to R. Assuming that the transmitter generates an E. M. F. equal to E, and solving for the current through the potentiometer, employ Kirchoff's law in the well known manner, it is found that the current I through the potentiometer is given by the following:

$$(1) \quad I = \frac{E}{(T+R+K\sqrt{X}) + T\left(\frac{K\sqrt{X}+R}{X}\right)}$$

The value of constant K is chosen such that the resistances T and R are negligibly small in comparison to the value $K\sqrt{X}$ and hence may be neglected where they are additive to $K\sqrt{X}$. Therefore, the preceding equation reduces to $$(1) \quad I = \frac{E}{K\sqrt{X} + \frac{TK\sqrt{X}}{X}};$$

and if the numerator and denominator of the right hand member are multiplied by $2\sqrt{TX}$, the equation may be arranged in the form:

$$(3) \quad I = \left(\frac{1}{K}\right)\left(\frac{E}{2\sqrt{T}}\right)\left(\frac{2\sqrt{TX}}{T+X}\right)$$

The constant K is so large, as pointed out above, that for practical purposes the combined resistance of 19 in series with the potentiometer 22, which is equal to $(K\sqrt{X}+R)$, does not alter the resistance of X by being connected in parallel with it, and hence the resistance X in parallel with $(K\sqrt{X}+R)$ is for practical purposes equal to X. Therefore, when in the operation of the apparatus as previously described contact 21 is so adjusted that receiver 25 gives a maximum output for the transmitter in circuit, it is known that the resistance of the rest of the circuit is equal to the internal resistance of the transmitter, or in other words that for practical purposes X is equal to T. Substituting the condition that X is equal to T in equation (3), the quantity in the right hand parentheisis becomes unity and hence the equation reduces to:

$$(4) \quad I = \left(\frac{1}{K}\right)\left(\frac{E}{2\sqrt{T}}\right)$$

With the transmitter working into a circuit having a resistance equal to the resistance of the transmitter itself, the maximum possible amount of power is delivered to the external circuit for any given electromotive force E; and this amount of power is equal to $\frac{E^2}{4T}$ where T is the resistance of the transmitter. It is seen that the quantity in the right hand parenthesis of equation (4) is equal to the square root of this maximum amount of power; in other words, that the current through the potentiometer is equal to a constant times the square root of the power delivered to the circuit by the transmitter, the circuit being arranged so that it receives the maximum possible amount of power. Equation (4) therefore becomes:

$$(5) \quad I = \left(\frac{1}{K}\right)(\sqrt{P}) \text{ where}$$

P is the power delivered to the external circuit by the transmitter. Using the subscripts $s$ and $x$ to denote respectively that the standard transmitter and the transmitter to be tested are in circuit, equation (5) shows that $$(6) \quad I_x = \frac{1}{K}\sqrt{P_x}$$

and $$(7) \quad I_s = \frac{1}{K}\sqrt{P_s}$$

from which:

$$(8) \quad \frac{\sqrt{P_x}}{\sqrt{P_s}} = \frac{I_x}{I_s}$$

Referring to equations (III) and (IV) it is seen from equation (8) that any scale which will give a measure of the ratio $$\frac{I_x}{I_s}$$

of the currents through the potentiometer, can be calibrated to give the efficiency of a transmitter directly in terms of miles of standard cable.

Any suitable point such as indicated may be chosen as zero for scale 503. When adjustment is made using the standard transmitter tap 24 is placed at the point corresponding to zero. When the adjustment is made using the unknown transmitter 10 a position for tap 24 is found which causes the volume of sound emitted from receiver 25 to equal the volume emitted using the standard transmitter with tap 24 in the zero position. Suppose this position is that marked $a$ on the scale. Let $r_s$ equal the resistance of the potentiometer between conductor 501 and the zero of the scale, and let $r_x$ equal the resistance between conductor 501 and the point marked $a$. Since the receiver 25 emits the same amount of sound in the two cases, the voltages applied to the amplifier are equal, or:

$$(9) \quad I_s r_s = I_x r_x \text{ from which}$$

$$(10) \quad \frac{I_x}{I_s} = \frac{r_s}{r_x}$$

Obviously, scale 503 measures $r_x$ and also $$\frac{r_s}{r_x}$$

since $r_s$ is a constant. Therefore the scale measures the ratio $$\frac{I_x}{I_s}$$

which in turn is equal to $$\frac{\sqrt{P_x}}{\sqrt{P_s}}$$

thereby allowing the scale to be calibrated to give efficiencies directly in terms of miles of standard cable.

In Fig. 2 there is disclosed a Wheatstone bridge circuit for current supply to be used in place of the circuit arrangement in Fig. 1 at the left of terminals 17 and 18. In this arrangement a source of current supply 13 in series with an adjustable controlling resistance 14 forms one diagonal of the bridge network and is connected in parallel with a condenser 28. The current indicating meter 29 forms the other diagonal of the bridge network. The fixed resistances 26 and 27 form two arms of the bridge and the transmitter circuit containing either the standard transmitter 11 or the transmitter 10 under test in series with a current indicating meter 15, forms the third arm of the bridge. The testing circuit of Fig. 1, that is, the portion of the circuit at the right of terminals 17 and 18 forms the fourth arm of the bridge. In operation the current supply is adjusted by means of series resistance 14 until the meter 15 indicates the desired current flow in the transmitter circuit and the contact member 21 of the receiver circuit is then adjusted until the joint resistance of the series parallel combination of the resistances 19 and 20 is such as to indicate zero current flow in the meter 29, thus indicating equal impedances in the two variable arms of the Wheatstone bridge network and, therefore, the condition for maximum power output of the transmitter.

In Fig. 3, a circuit arrangement similar to Fig. 1 is shown adapted for the testing of receivers. In this arrangement, transmitter 31 is connected in circuit with a potentiometer coil 32 and a source of current supply 30. A series resistance coil 34 and shunt coil 36 corresponding to coils 19 and 20 respectively, of Fig. 1, are connected in circuit as shown, and movable contact member 35 is provided for simultaneously varying these resistances and at the same time maintaining the relationship therebetween such that resistance 34 is always equal to a certain constant times the square root of the resistance 36. A variable condenser 37 is so connected in the receiving circuit as to be in series with either the receiver 38 being tested or the standard receiver 39 employed for comparison purposes. A switch 40 is provided as shown for placing either the test receiver or standard receiver in circuit. The purpose of the variable condenser 37 is to nullify the reactance of the receiver in the circuit so that the receiver may absorb a maximum of power.

In operation, transmitter 31 is energized by a constant source of sound and contact member 35 is moved to such a position and condenser 37 is so adjusted as to give a maximum volume of sound in the receiver in circuit. Settings of contact member 35 and the condenser 37 are thus obtained for receiver 38 and for standard receiver 39. By means of the switch 40 either receiver is connected in the circuit and at the same time contact member 35 and adjustable condenser 37 are set at the adjustments above indicated. The adjustment of contact member 35 with the standard receivers in circuit is made with contact member 32 in position corresponding to the zero point of the scale. After adjusting contact member 35 with the receiver to be tested in circuit the tap 33 is then adjusted until the receiver emits the same volume of sound as was emitted by the standard receiver when the preceding adjustment was made. The position of the index associated with tap 33 then indicates directly the efficiency of the unknown receiver, the scale being preferably calibrated directly in terms of miles of standard cable. The operation of the circuit used for receiver testing is similar to that shown in Fig. 1 used for transmitter testing, and hence, it is believed to be unnecessary to give a complete mathematical explanation showing that scale 506 may be calibrated directly in terms of miles of standard cable. The actual arrangement of apparatus for commercial testing in accordance with this schematic arrangement will be more clearly explained in connection with Fig. 6.

In Fig. 4 a modified transmitter circuit is shown in which the transmitter is furnished with a steady supply of direct current without necessitating variable currents traversing the source of current supply. In this arrangement an adjustable resistance 41 is set to provide suitable current flow through the transmitter 31. An inductance coil 42 is provided to prevent the fluctuations in current passing through the source of current supply 30. This modification only pertains to the method of supplying the transmitter current, the remaining portion of the circuit being identical with that shown in Fig. 3 at the right of the terminals 17 and 18.

In Fig. 5 there is disclosed a circuit arrangement for the commercial testing of transmitters in which a test transmitter 53 is compared with a standard transmitter 52. In operation the switch 54 is first thrown into its upper position, switches 50 and 51 being thrown in their left-hand positions, and switch 80 being in its down position. With these switching conditions established and without subjecting the transmitter 52 to sound vibrations, resistance 56 is adjusted until ammeter 71 indicates the current value under which it is desired to test the operation of the transmitter. With the arrangement disclosed it is possible to test the transmitters at a chosen current value, with a chosen potential across the transmitter or for a chosen power output of the transmitter. Switch 54 is then thrown into its down position and resistance 86 is adjusted until ammeter 71 indicates the desired current value for the operation of the transmitter. Switch 54 is now thrown again into its upper position and the standard transmitter 52 is actuated from a constant source of sound thereby producing variable currents in the associated circuits. The adjustable member 61 is moved along its resistances 62 and 76 until the volume of sound registered in receiver 83 is a maximum, thus indicating that the impedance of the receiver circuit is equal to that of the transmitter circuit, which is the condition for maximum power output of the transmitter. Switch 54 is next thrown into its down position, transmitter 53 is actuated from the same source of sound as used with the transmitter 52, and adjustable contact member 89 is moved along its associated resistances 62 and 76 until a maximum volume of sound is obtained in receiver 83, thus indicating the adjustment of the resistance network to give an impedance value in the receiver circuit equivalent to that of test transmitter 53. This method of adjusting the impedance of the receiving circuit to equal that of the transmitting circuit is similar to that employed in Fig. 1, and the apparatus is so arranged that the adjustments once established may be retained fixed during the remainder of the test, thereby leaving only one adjustment to be made in the actual determination of efficiency. Having made the adjustments of the contact members 61 and 89, switch 54 is thrown alternately to its upper and lower positions, transmitters 52 and 53 being actuated by the same source of sound, and the relative response at receiver 83. If the test transmitter 53 is less efficient than the standard transmitter 52, as indicated by the smaller volume of sound at receiver 83 when transmitter 53 is in circuit, then switches 54 and 80 are operated simultaneously in the same direction, the adjustable contact member 81 being moved in contact with its associated potentiometer resistance 82 until a point is found where the response of receiver 83 is the same for the two transmitters. Since resistance 82 is calibrated in efficiency units, the position of member 81 indicates the efficiency of the test transmitter 53 as compared with the standard transmitter 52. If the preliminary setting of the circuit indicates that the test transmitter 53 is more efficient than the standard 52, the procedure of determining the actual efficiency is identical with that just described with the exception that switches 54 and 80 are always maintained in opposite positions with respect to each other.

An arrangement for the commercial testing of receivers is disclosed in Fig. 6 in which the source of sound consists of a transmitter 112 operated from a source of power 110, the amount of current through the transmitter being determined by an adjustable resistance 114. An ammeter 111 is provided to measure the current flowing through the transmitter, and a voltmeter 146 is associated with a switch 147 so that when the switch lever is thrown to the left, the voltmeter measures the potential across the transmitter, and when it is thrown to the right-hand position the voltage of the source of power 110 is indicated. A condenser 148 is provided as a path for fluctuating currents to obviate their passage through the source of power 110. By means of a switch 117, either the standard receiver 115 or the receiver 116 under test is connected to a circuit of the type shown schematically in Fig. 3, which circuit includes a potentiometer resistance 113, a shunt resistance 121, and series resistance 122. In order to provide for the test receiver being more or less efficient than the standard receiver, switch 118 is provided as shown. If the test receiver is less efficient than the standard receiver 115, switches 117 and 118 are thrown in their alternate positions simultaneously and in such a manner that they both point in the same direction at the same time, whereas if the test receiver is more efficient than the standard receiver the switches are so thrown as to always point in the opposite direction. With switch 118 thrown in its down position, switch 117 is thrown alternately into its up and down positions, transmitter 112 being energized from a constant source of sound. Adjustable contact members 124 and 138 are then moved in contact with their associated resistances and condensers 135 and 142 are adjusted until the maximum volume of sound possible is emitted at both receivers 115 and 116. With the positions of movable contacts 124 and 138 determined, the transmitter 112 is energized from a constant source of sound and contact member 156 is moved along resistance 113 until the point is found where the response is the same for receivers 115 and 116. Since the potentiometer resistance 113 is calibrated in effeciency units, this point of adjustment indicates directly the efficiency of test receiver 116 as compared with the standard receiver 115. Depending upon the position of switch 118, this efficiency is expressed as "positive" units or "minus" units.

The testing circuit of Fig. 7 is a combination of the circuits shown in Figs. 5 and 6 and is arranged for the testing of either transmitters or receivers. When testing to determine the efficiency of a transmitter 257 as compared with a standard transmitter 226, the switches 200, 201 and 203 are thrown to their left-hand positions; switches 202 and 256 are thrown to their upper positions; and switch 240 is thrown up. A circuit may then be traced from the positive terminal of battery 204 through adjustable resistance 205, switch terminal 206, switch blade, switch terminal 207, switch terminal 209 of switch 203, switch blade, switch terminals 210 and 211, switch blade, switch terminals 212 and 213, switch blade, switch terminal 214, the right-hand connector of adjustable contact member 216, a portion of the shunt resistance 217, switch terminal 220, switch blade, switch terminal 221, switch terminal 223 of switch 202, switch blade, switch terminal 224, standard transmitter 226, switch 200, ammeter 230, terminal 231, switch blade, and return to the negative terminal of the battery 204. In parallel with a portion of this circuit, a circuit may be traced starting from switch terminal 211 of switch 203, switch terminal 233, switch blade, switch terminal 234, switch terminal 235, of switch 202, switch blade, switch terminal 236, left-hand connector of adjustable contact member 216, a portion of the series resistance 238 associated therewith, switch terminal 239, switch blade 240, switch terminal 243, switch blade, switch terminal 244, switch terminal 246 of switch 256, switch blade, adjustable condenser 248, switch terminal 249, switch blade, telephone receiver 251 which in this instance may be a standard receiver, switch terminal 254, switch blade, switch terminal 255, switch terminal 220. The potentiometer 275 is in parallel with the circuit containing the receiver and variable condenser.

Leaving all of the switches in the position as described above, except switch 202, which is thrown in its down position, a circuit may be traced for test transmitter 257 similar to that described in connection with standard transmitter 226.

A voltmeter 272 is provided in conjunction with a switch 270 for the purpose of determining the potential drop across the transmitters and for determining the voltage of the transmitter batteries. The voltmeter measures the voltage drop across the transmitter 226 when switch 270 is thrown to the left and measures the voltage of battery 204 when switch 270 is thrown to the right. With the switch 202 in its lower position, the voltmeter measures the voltage drop across the transmitter 257 when the switch 270 is thrown to the left and measures the voltage of battery 258 when the switch 270 is thrown to the right.

With all of the switches in the positions described above, switch 202 is thrown to its alternate positions and resistances 205 and 259 are adjusted until ammeter 230 indicates the correct current values for the operation of the respective transmitters. Contact members 216 and 267 are then adjusted for those possitions which give a maximum response for the respective transmitters at the receiver 251. If the test transmitter 257 is found to be more efficient than the standard transmitter 226, switches 202 and 240 are thrown simultaneously in their alternate positions, the switch blades always pointing in the same direction at a given time. The adjustable contact member 274 is then moved along the potentiometer resistance 275 until the point is found at which the response produced in the receiver 251 is the same for transmitters 226 and 257. The potentiometer resistance 275 is calibrated in efficiency units and the point of adjustment thus indicates directly the efficiency of the transmitter under test. In this case the indication would be recorded as "plus" units. If in the preliminary tests the transmitter under test is found to be less efficient than the standard, as determined by the response of the receiver to the respective transmitters, the procedure for determining the exact efficiency is identical with that just described with the exception that switches 202 and 240 are operated with their blades always pointing in opposite directions. Under this condition the efficiency determined is recorded as "minus" units.

In the use of the circuit of Fig. 7 for the testing of receivers, the main change in circuit connections consists in throwing the switch 203 in the reverse or right-hand position, and since but a single source of variable current is required, this source consists of the standard transmitter 226 in the circuit described. With switches 200 and 201 thrown to their left-hand positions, switch 203 thrown to its right-hand position, and switches 202, 240 and 256 thrown to their upper positions, a circuit may be traced from positive terminal of battery 204 through the adjustable resistance 205, switch terminal 206, switch blade, switch terminal 207, switch terminal 278 of switch 203, switch blade, switch terminal 243, potentiometer resistance 275, switch terminal 255, switch blade, switch terminal 219, switch terminal 223, switch blade, switch terminal 224, transmitter 226, switch 200, ammeter 230, switch terminal 231, switch blade, back to the negative terminal of battery 204. In parallel with the potentiometer resistance 275, a circuit may be traced starting from the lower terminal of potentiometer resistance 275 through switch 240, a portion of series resistance 238, left-hand connector of adjustable contact member 216, switch terminal 279 of switch 256, switch blade, switch terminals 280, 281, switch blade, switch terminal 211, switch blade, switch terminals 282 and 283, switch blade, switch terminal 284, right-hand connector of adjustable contact member 216, portion of shunt resistance 217 back to the upper terminal of potentiometer resistance 275.

A third circuit may be traced starting from switch terminal 211 passing through the switch terminal 210, switch blade, switch terminals 285, 246, switch blade, switch terminal 247, adjustable condenser 248, switch terminal 249, switch blade, switch terminal 250, standard receiver 251, switch terminal 286, switch blade, return to switch terminal 220. With all the switches, except switch 256, left in their positions as previously described, but with switch 256 thrown to its down position, circuits may be traced similar to those last described including adjustable contact member 267, test receiver 287 and adjustable condenser 288.

In the operation of this circuit for the testing of receivers the procedure is as follows: Switch 200 is first thrown to its left-hand position, switch 202 to its upper position, and switch 203 to its right-hand position, these switches being left in the positions designated during the use of the circuit for the testing of a receiver. With the transmitter 226 energized by the source of sound employed for testing, and with switch 240 thrown in its upper position, switch 256 is thrown in its alternate positions and adjustable contact members 216 and 267 are moved in contact with their associated resistances 217 and 238, and condensers 248 and 288 are adjusted until a maximum resistance is obtained from the associated receivers 251 and 287, respectively. By listening to the response of the two receivers, a rough estimate is obtained as to their relative efficiency, receiver 251 being considered as standard. If the response of receiver 287 is greater than that of the standard receiver 251, the test receiver is indicated as the more efficient and in the determination of the exact efficiency of this receiver, switches 240 and 256 are now thrown into their alternate positions, but in such a manner that both switches point in the same direction at the same time. With the transmitter 226 energized with a constant source of sound, adjustable contact member 274 is moved over its associated resistance 275 until an equal response is obtained from the receivers 251 and 287. Since the potentiometer resistance 275 is calibrated, the final position of the contact member 274 indicates directly the actual efficiency of the test receiver 287, this efficiency being indicated as "plus" units. If the preliminary comparison of receivers 251 and 257 indicates that the standard receiver 251 is more efficient than the test receiver 287, the procedure is identical with that just described, except that switches 240 and 256, when thrown into their alternate positions, are arranged so as to always point in opposite directions. Under this condition the efficiency determination, above described, is recorded as "minus" units.

What is claimed is:

1. In a testing circuit, a power transferring network comprising a shunt resistance and a series resistance, means for varying both of said resistances, said series resistance having for the different adjustments of said means a value substantially equal to a constant times the square root of the value of the shunt resistance and a graduated scale for indicating the adjustment of said means.

2. A testing circuit comprising an instrument to be tested, a standard instrument, a distortionless network comprising a series resistance, a shunt resistance and a potentiometer resistance, means for connecting said network alternately with said instruments, and means for comparing the operation of the instruments when so connected.

3. In a testing circuit, an instrument to be tested, a standard instrument, and a power transferring network comprising a shunt resistance and a series resistance, said series resistance having a value substantially equal to a constant times the square root of the value of said shunt resistance, and means to vary the value of said resistances while maintaining their relation fixed and to indicate directly in transmission units the efficiency of the instruments under test.

4. A testing circuit comprising an instrument to be tested, a standard instrument, a distortionless network for comparing the inherent efficiencies of said instruments, said network including a shunt resistance and a series resistance equal to a constant multiplied by the square root of the shunt resistance, and means for adjusting the values of said resistances while maintainng the relationship fixed.

5. In a testing circuit, an instrument to be tested, a standard instrument, and a power transferring network comprising a shunt resistance, a series resistance and a potentiometer connected to said series resistance, said series resistance having a value substantially equal to a constant times the square root of the value of said shunt resistance and means for connecting said network alternately with said instruments and means for determining the relative efficiency of the instruments under test.

6. The method of determining the inherent efficiency of a transmitter which consists in operating the transmitter under conditions of maximum power output in a circuit including a potentiometer, operating a standard transmitter under conditions of maximum power output in a circuit including said potentiometer, adjusting the position of the potentiometer until the response is the same for each transmitter, and determining from the point of adjustment the relative efficiency of the transmitter under test.

7. A method of testing speech transmission instruments comprising the comparison of one instrument with another as a standard by operating them in circuits adjusted to give their maximum outputs and then equalizing a portion of the outputs to obtain indication of their relative efficiencies.

In witness whereof, I hereunto subscribe my name this 22nd day of December, A. D. 1921.

HARVEY FLETCHER.